US012761461B2

(12) United States Patent
King et al.

(10) Patent No.: US 12,761,461 B2
(45) Date of Patent: Oct. 13, 2026

(54) MEMORIZED ALLOY GUIDE TUBE AND METHOD FOR INSPECTING INDIRECTLY ACCESSIBLE CAVITY OF GAS TURBINE ENGINE

(71) Applicant: RTX Corporation, Farmington, CT (US)

(72) Inventors: Christopher R. King, Terryville, CT (US); John B. Matthews, Amston, CT (US); John A. Sharon, West Hartford, CT (US)

(73) Assignee: RTX CORPORATION, Farmington, CT (US)

(*) Notice: Subject to any disclaimer, the term of this patent is extended or adjusted under 35 U.S.C. 154(b) by 275 days.

(21) Appl. No.: 18/598,679

(22) Filed: Mar. 7, 2024

(65) Prior Publication Data

US 2025/0284113 A1 Sep. 11, 2025

(51) Int. Cl.
*G02B 23/24* (2006.01)
*G01N 21/954* (2006.01)

(52) U.S. Cl.
CPC ....... *G02B 23/2476* (2013.01); *G01N 21/954* (2013.01); *G01N 2021/9542* (2013.01)

(58) Field of Classification Search
None
See application file for complete search history.

(56) References Cited

U.S. PATENT DOCUMENTS 4,790,624 A * 12/1988 Van Hoye ................ B25J 18/06 600/151
4,799,474 A * 1/1989 Ueda ............... A61M 25/09033 604/291
4,846,573 A * 7/1989 Taylor .................. A61B 1/0055 356/241.4
9,492,906 B2 11/2016 Rösing et al.
2009/0079821 A1* 3/2009 Bousquet ............ G01M 13/028 348/E7.085
2020/0046213 A1 2/2020 Bendory

FOREIGN PATENT DOCUMENTS

EP 3031539 B1 12/2019
JP H08243974 A 9/1996
JP H1164429 A 3/1999
KR 101524683 B1 6/2015

OTHER PUBLICATIONS

EP Search Report for EP Patent Application No. 25162402.9 dated Aug. 7, 2025.

* cited by examiner

*Primary Examiner* — Eric S. McCall
*Assistant Examiner* — Nigel H Plumb
(74) *Attorney, Agent, or Firm* — Getz Balich LLC

(57) ABSTRACT

A method of inspecting an indirectly accessible cavity of a gas turbine engine is provided. The method includes memorizing a guide tube formed of smart metal alloy (SMA) into a bent shape and straightening the guide tube. The method also includes installing a scope, which includes a connecting line to which an inspection element is attached, into the guide tube. The method then includes inserting the guide tube into the gas turbine engine toward a location of the indirectly accessible cavity, heating the guide tube to cause the guide tube to return to the bent shape in order to bring the inspection element into the indirectly accessible cavity and using the inspection element to perform an inspection of the indirectly accessible cavity.

20 Claims, 5 Drawing Sheets

MEMORIZED ALLOY GUIDE TUBE AND METHOD FOR INSPECTING INDIRECTLY ACCESSIBLE CAVITY OF GAS TURBINE ENGINE

BACKGROUND

Exemplary embodiments of the present disclosure relate generally to inspection tools and, in some embodiments, an inspection tool that uses memorized alloy for reaching an inaccessible location.

A gas turbine engine generates power from combustion of fuel and air. Air is drawn into the gas turbine engine through an inlet and is compressed in a compressor. Compressed air is then mixed with fuel and combusted in a combustor to produce high-temperature and high-pressure working fluid. The working fluid is directed to a turbine where the working fluid is expanded and aerodynamically interacts with turbine vanes and blades. The expanded working fluid can be exhausted to generate thrust in an engine. The aerodynamic interaction of the working fluid with the turbine blades and vanes causes turbine disks, to which the blades are attached, to rotate. This in turn causes a rotor to rotate. The rotation of the rotor can be used to operate the compressor, to rotate a fan at the inlet and to generate electricity.

Routine inspection of gas turbine engines is often important to confirm that all of its component parts are in good condition and working properly. Therefore, a continuing need exists for improvements inspection tools and processes.

BRIEF DESCRIPTION

According to an aspect of the disclosure, a method of inspecting an indirectly accessible cavity of a gas turbine engine is provided. The method includes memorizing a guide tube formed of smart metal alloy (SMA) into a bent shape and straightening the guide tube. The method also includes installing a scope, which includes a connecting line to which an inspection element is attached, into the guide tube. The method then includes inserting the guide tube into the gas turbine engine toward a location of the indirectly accessible cavity, heating the guide tube to cause the guide tube to return to the bent shape in order to bring the inspection element into the indirectly accessible cavity and using the inspection element to perform an inspection of the indirectly accessible cavity.

In accordance with additional or alternative embodiments, the method further includes re-straightening the guide tube following inspection completion and removing the guide tube from the gas turbine engine.

In accordance with additional or alternative embodiments, the re-straightening of the guide tube is accomplished during the removing of the guide tube from the gas turbine engine.

In accordance with additional or alternative embodiments, the re-straightening of the guide tube includes inserting a straightening rod into the guide tube.

In accordance with additional or alternative embodiments, the heating includes directing hot air into the guide tube.

In accordance with additional or alternative embodiments, the bent shape in characterized in that the guide tube has multiple bends and the heating is executed to cause the guide tube to return to the bent shape with the multiple bends.

In accordance with additional or alternative embodiments, the method further includes tailoring a chemistry of the guide tube to support the multiple bends.

According to an aspect of the disclosure, a guide tube assembly is provided for inspecting an indirectly accessible cavity of a gas turbine engine. The guide tube assembly includes a guide tube formed of smart metal alloy (SMA), which is memorized into a bent shape and then straightened, and a scope. The scope includes a connecting line to which an inspection element is attached and which is installed into the guide tube.

In accordance with additional or alternative embodiments, a hot air source is coupled to the guide tube and is configured to heat the guide tube by directing hot air into the guide tube.

In accordance with additional or alternative embodiments, the guide tube is configured to be re-straightened following inspection completion and removed from the gas turbine engine.

In accordance with additional or alternative embodiments, at least one of the guide tube is configured such that the re-straightening of the guide tube is accomplished during removal of the guide tube from the gas turbine engine and the guide tube assembly further includes a straightening rod insertable into the guide tube to re-straighten the guide tube.

In accordance with additional or alternative embodiments, the guide tube includes an outer guide tube, which is formed of SMA, and which is memorized into a bent shape and then straightened and an inner guide tube, which is formed of SMA, and which is memorized into a straight shape and then bent. The outer and inner guide tubes are coaxial and heatable to return to the respective memorized bent or straight shapes at different temperatures.

In accordance with additional or alternative embodiments, the guide tube includes a first guide tube side, which is formed of SMA, and which is memorized into a bent shape and then straightened and a second guide tube side, which is formed of SMA, and which is memorized into a straight shape and then bent. The first and second guide tube sides are attachable and heatable to return to the respective memorized bent or straight shapes at different temperatures.

In accordance with additional or alternative embodiments, the bent shape is characterized in that the guide tube has multiple bends and the heating is executed to cause the guide tube to return to the bent shape with the multiple bends and a chemistry of the guide tube is tailored to support the multiple bends.

According to an aspect of the disclosure, a guide tube assembly is provided for inspecting an indirectly accessible cavity of a gas turbine engine. The guide tube assembly includes a guide tube formed of smart metal alloy (SMA), which is memorized into a bent shape and then straightened, and a scope. The scope includes a connecting line to which an inspection element is attached and which is installed into the guide tube. The guide tube is insertable into the gas turbine engine toward a location of the indirectly accessible cavity and heatable to cause the guide tube to return to the bent shape in order to bring the inspection element into the indirectly accessible cavity whereupon the inspection element is disposable to inspect the indirectly accessible cavity. The guide tube is configured to be re-straightened following inspection completion and removed from the gas turbine engine.

In accordance with additional or alternative embodiments, a hot air source is coupled to the guide tube and is configured to heat the guide tube by directing hot air into the guide tube.

In accordance with additional or alternative embodiments, at least one of the guide tube is configured such that the re-straightening of the guide tube is accomplished during removal of the guide tube from the gas turbine engine and the guide tube assembly further includes a straightening rod insertable into the guide tube to re-straighten the guide tube.

In accordance with additional or alternative embodiments, the guide tube includes an outer guide tube, which is formed of SMA, and which is memorized into a bent shape and then straightened and an inner guide tube, which is formed of SMA, and which is memorized into a straight shape and then bent. The outer and inner guide tubes are coaxial and heatable to return to the respective memorized bent or straight shapes at different temperatures.

In accordance with additional or alternative embodiments, the guide tube includes a first guide tube side, which is formed of SMA, and which is memorized into a bent shape and then straightened and a second guide tube side, which is formed of SMA, and which is memorized into a straight shape and then bent. The first and second guide tube sides are attachable and heatable to return to the respective memorized bent or straight shapes at different temperatures.

In accordance with additional or alternative embodiments, the bent shape is characterized in that the guide tube has multiple bends and the heating is executed to cause the guide tube to return to the bent shape with the multiple bends and a chemistry of the guide tube is tailored to support the multiple bends.

These and other advantages and features will become more apparent from the following description taken in conjunction with the drawings.

BRIEF DESCRIPTION OF THE DRAWINGS

The following descriptions should not be considered limiting in any way. With reference to the accompanying drawings, like elements are numbered alike.

These and other advantages and features will become more apparent from the following description taken in conjunction with the drawings.

DETAILED DESCRIPTION

A detailed description of one or more embodiments of the disclosed apparatus and method are presented herein by way of exemplification and not limitation with reference to the Figures.

Figure 1:
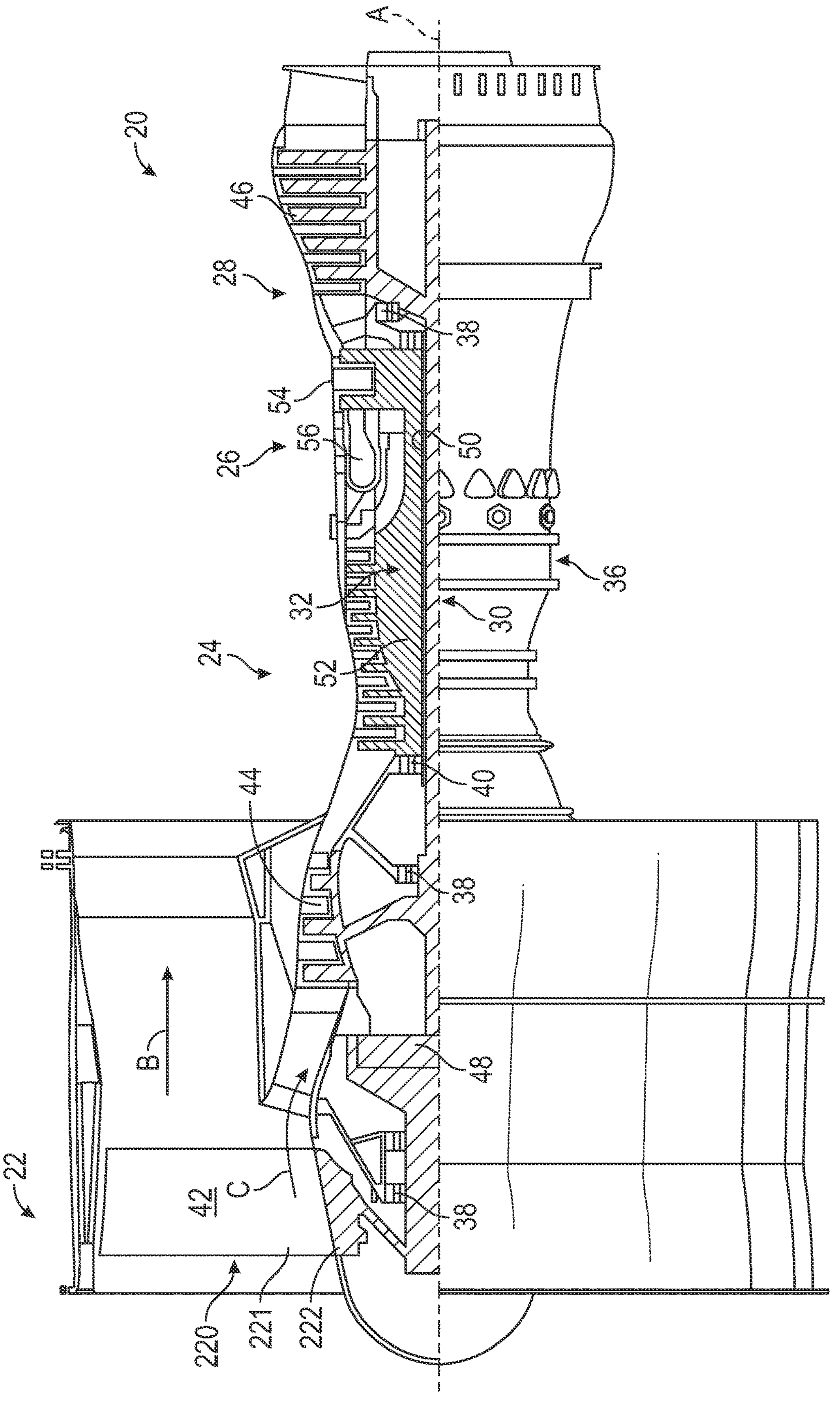
FIG. 1 is a partial cross-sectional view of a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include other systems or features. The fan section 22 drives air along a bypass flow path B in a bypass duct, while the compressor section 24 drives air along a core flow path C for compression and communication into the combustor section 26 and then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary gas turbine engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a low pressure compressor 44 and a low pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a high pressure compressor 52 and high pressure turbine 54. A combustor 56 is arranged in the gas turbine engine 20 between the high pressure compressor 52 and the high pressure turbine 54. The engine static structure 36 is arranged generally between the high pressure turbine 54 and the low pressure turbine 46. The engine static structure 36 further supports the bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 and then the high pressure compressor 52, is mixed and burned with fuel in the combustor 56 and is then expanded over the high pressure turbine 54 and the low pressure turbine 46. The high and low pressure turbines 54 and 46 rotationally drive the low speed spool 30 and the high speed spool 32, respectively, in response to the expansion. It will be appreciated that each of the positions of the fan section 22, compressor section 24, combustor section 26, turbine section 28, and fan drive gear system 48 may be varied. For example, geared architecture 48 may be located aft of the combustor section 26 or even aft of the turbine section 28, and the fan section 22 may be positioned forward or aft of the location of geared architecture 48.

Currently, inspections for second stage disks in a high-pressure turbine, such as the high-pressure turbine 54 of FIG. 1, require access to first-second high-pressure turbine rotor cavities. The tooling support that is required for these types of inspections often need to provide for usages of different sized tooling to prevent tooling location errors and to allow for quick changeovers. In certain cases, gas turbine engine product have been experiencing relatively high engine removals due to potential powder metal defects in high-pressure compressor/high-pressure turbine (HPC/HPT) disks. In these or other cases, a guide tube is often required to provide guidance of inspection tools.

Accordingly, a need exists for tooling and tooling support that allows for tool guidance for inspection tools when it is necessary for the inspection tools to curve or change direction.

Therefore, as will be described below, tubing is provided with smart memory alloy (SMA), such as Nitinol™, which will allow for guidance for inspection tools in regions of gas turbine engines for example that are typically inaccessible. Such tubing will be able to support difficult boroscope inspections in particular. In addition, the tubing will provide for straightening of the tubing for when the inspection tools are removed from the inspection site.

Figure 2:
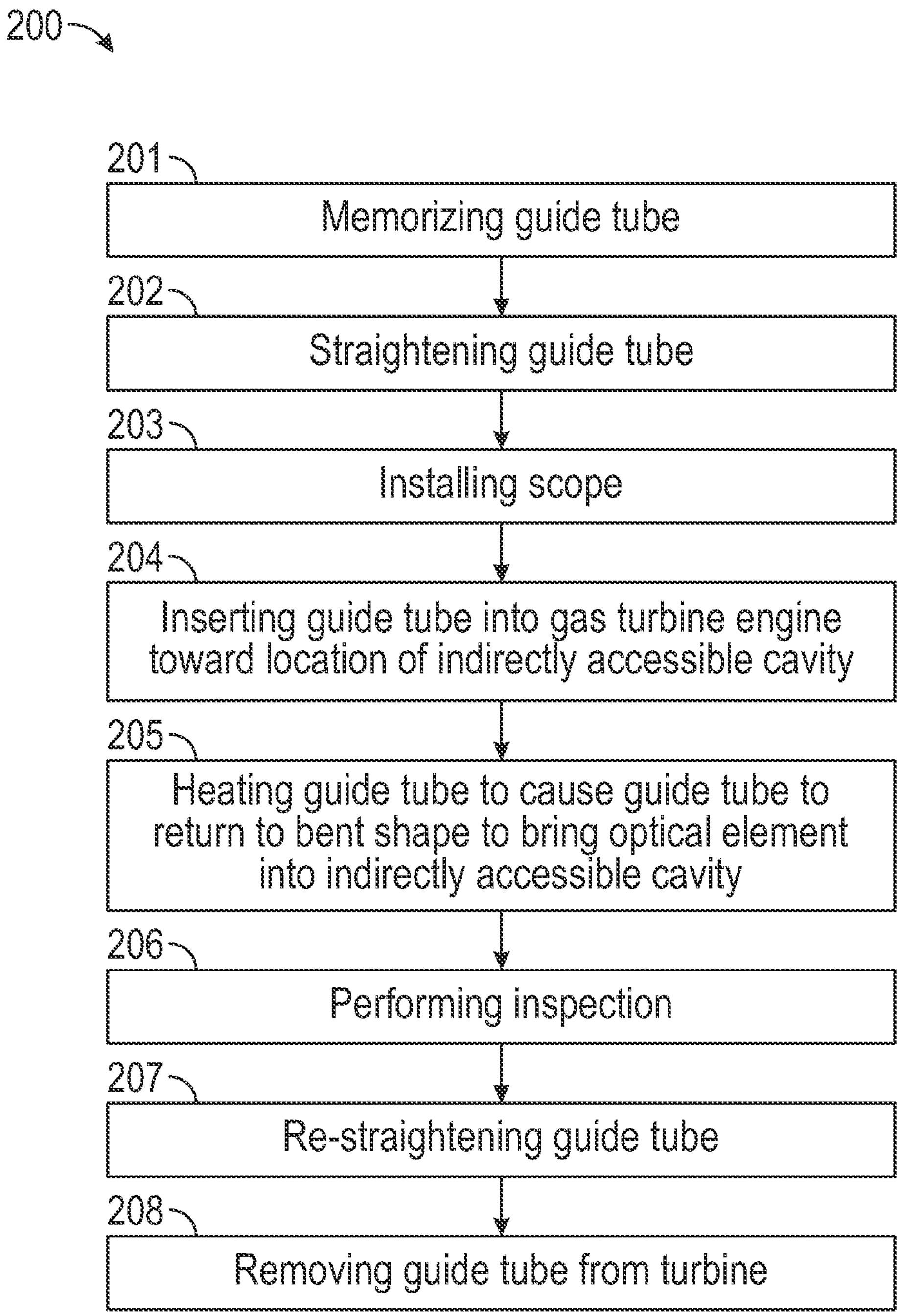
FIG. 2 is a flow diagram illustrating a method of inspecting an indirectly accessible cavity of a gas turbine engine in accordance with embodiments.
Figure 3:
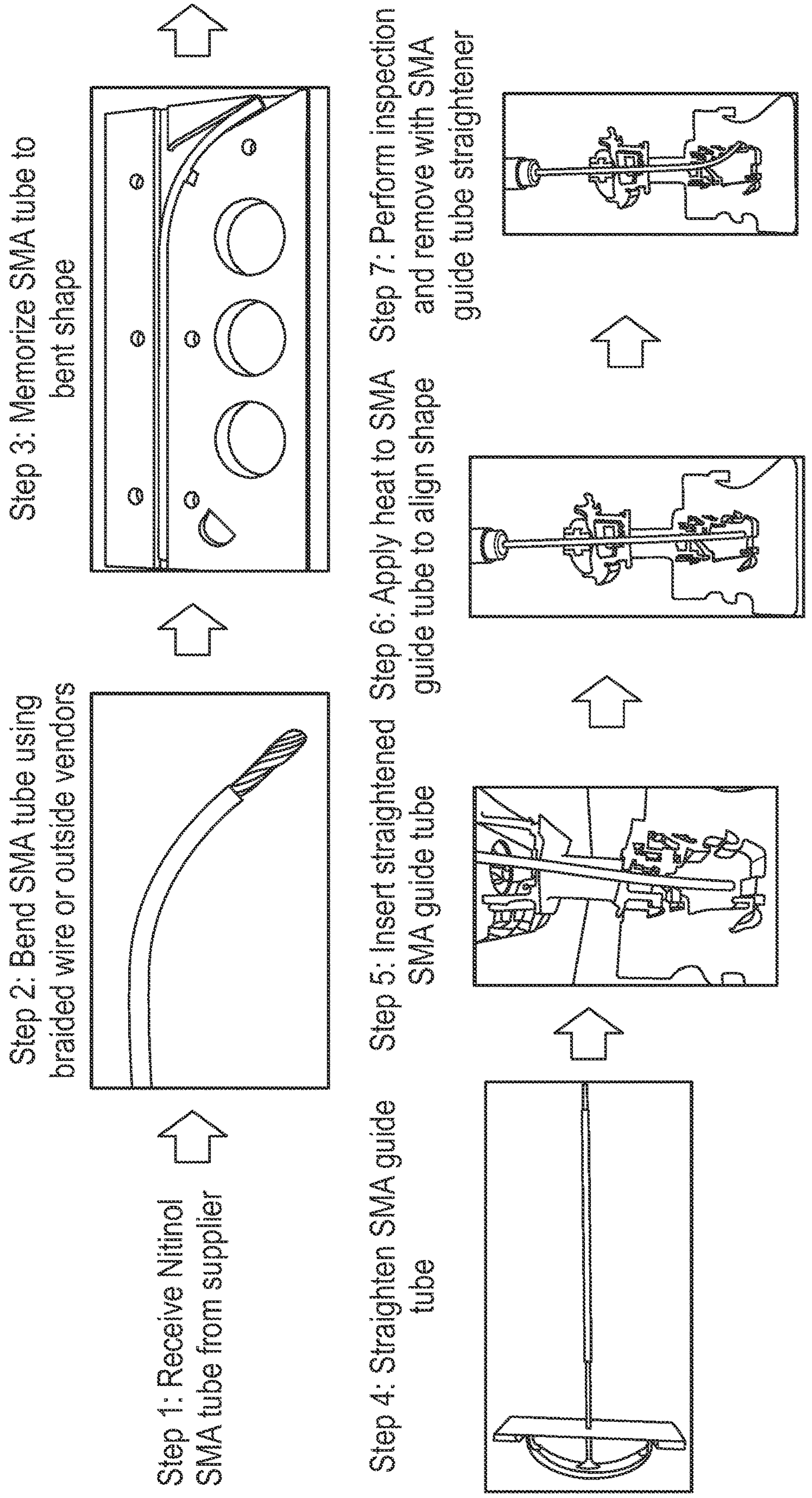
FIG. 3 is a flow diagram illustrating further details of the method of FIG. 2 in accordance with embodiments.

With reference to FIGS. 2 and 3, a method 200 of inspecting an indirectly accessible cavity of a gas turbine engine is provided. As shown in FIGS. 2 and 3, the method 200 includes memorizing a guide tube formed of SMA into a bent shape (block 201 of FIG. 2 and Steps 2 and 3 of FIG. 3), straightening the guide tube (block 202 of FIG. 2 and Step 4 of FIG. 3), installing a scope, which includes a connecting line to which an inspection element is attached, into the guide tube (block 203 of FIG. 2, not shown in FIG. 3), inserting the guide tube into the gas turbine engine toward a location of the indirectly accessible cavity (block 204 of FIG. 2 and Step 5 of FIG. 3), heating the guide tube to cause the guide tube to return to the bent shape in order to bring the inspection element into the indirectly accessible cavity (block 205 of FIG. 2 and Step 6 of FIG. 3) and using the inspection element to perform an inspection of the indirectly accessible cavity (block 206 of FIG. 2 and Step 7 of FIG. 3). The inspection element can include, but is not limited to, an optical element and/or a sensing element (e.g., an ultrasonic sensor, a magnetometer, an oscilloscope, an accelerometer, etc.). As is further shown in FIG. 2, the method 200 can further include re-straightening the guide tube following inspection completion (block 207 of FIG. 2) and removing the guide tube from the gas turbine engine (block 208 of FIG. 2).

In accordance with embodiments, the re-straightening of the guide tube of block 207 of FIG. 2 can be accomplished during the removing of the guide tube from the gas turbine engine of block 208 of FIG. 2 by pulling the guide tube against rigid components of the gas turbine engine (without damaging the components) or can be accomplished by inserting a straightening rod into the guide tube.

In accordance with embodiments, the heating of the guide tube of block 205 of FIG. 2 and Step 6 of FIG. 3 can include directing (e.g., diverting, pumping and/or blowing) hot air into the guide tube.

Figure 4:
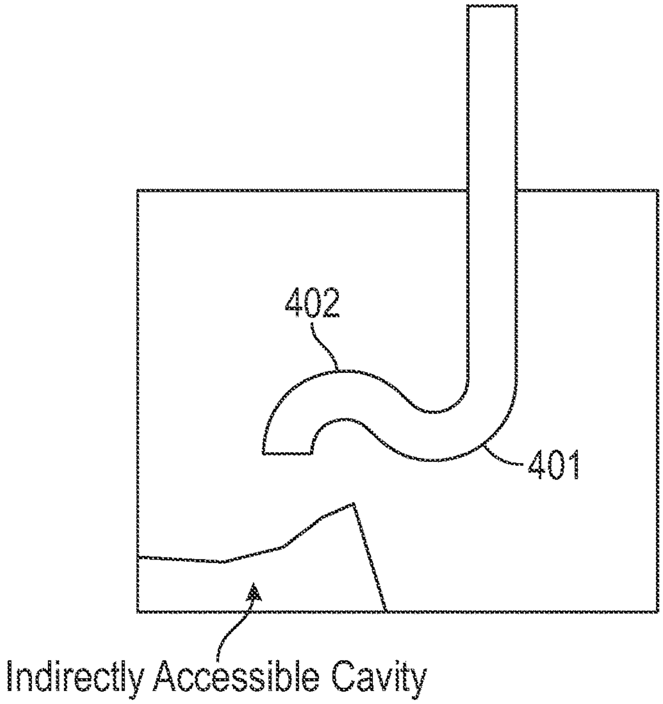
FIG. 4 is a schematic illustration of a guide tube for inspecting an indirectly accessible cavity of a gas turbine engine with multiple bends in accordance with embodiments.

With reference to FIG. 4, the bent shape of the guide tube can be characterized in that the guide tube has multiple bends 401, 402 and the heating of block 205 of FIG. 2 and Step 6 of FIG. 3 can be executed to cause the guide tube to return to the bent shape with the multiple bends 401, 402. In these or other cases, the method 200 can optionally include tailoring a chemistry of the guide tube to support the multiple bends 401, 402.

Figure 5:
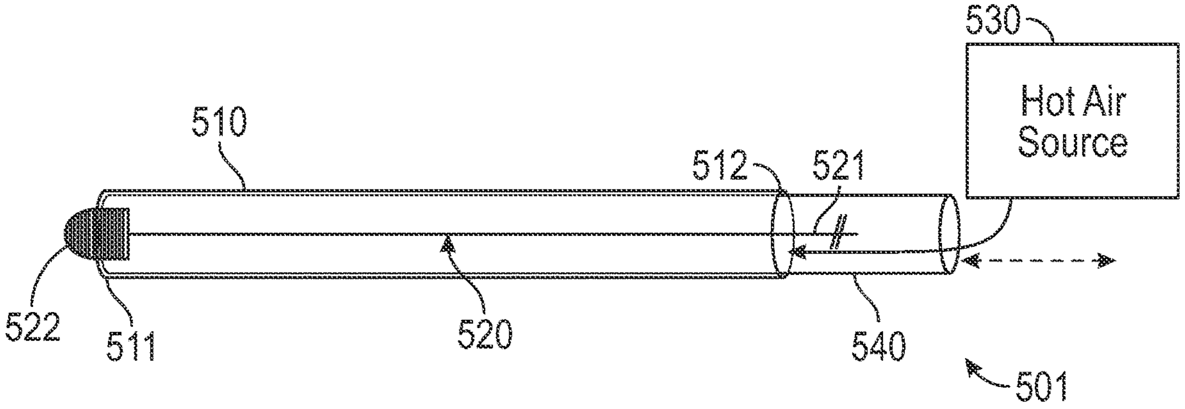
FIG. 5 is a side schematic view of a guide tube assembly for inspecting an indirectly accessible cavity of a gas turbine engine in accordance with embodiments.

With reference to FIG. 5, a guide tube assembly 501 is provided for inspecting an indirectly accessible cavity of a gas turbine engine. As shown in FIG. 5, the guide tube assembly 501 includes a guide tube 510 that is formed of SMA and is memorized into a bent shape and then straightened and a scope 520, such as a boroscope, which includes a connecting line 521 to which an inspection element 522 is attached. The scope 520 is installed into the guide tube 510 such that the inspection element 522 is disposed at a first end 511 of the guide tube 510. The inspection element 522 can include, but is not limited to, an optical element and/or a sensing element (e.g., an ultrasonic sensor, a magnetometer, an oscilloscope, an accelerometer, etc.). The guide assembly 501 can further include a hot air source 530 that is coupled to a second end 512 of the guide tube 510, which is opposite the first end 511 of the guide tube 510. The hot air source 530 can be configured to heat the guide tube 510 by directing (e.g., diverting, pumping and/or blowing) hot air into the guide tube 510 via the second end 512. The guide tube 510 is configured to be re-straightened following inspection completion and removed from the gas turbine engine. The guide tube 510 can be configured such that the re-straightening of the guide tube 510 is accomplished during removal of the guide tube 510 from the gas turbine engine by, e.g., pulling the guide tube 510 against rigid components of the gas turbine engine (without damaging the components). As an alternative, the guide tube assembly 501 can further include a straightening rod 540, which insertable into the guide tube 510 to re-straighten the guide tube 510.

It is to be understood that, while the description provided herein refers to the hot air source 530 for heating the guide tube 510, other heating options are available. These include, but are not limited to, using current and/or resistive heating to heat the guide tube 510. The description of the hot air source 530 should therefore be understood as exemplary and not limiting of the description or the following claims.

With the guide tube assembly 501 described above, the guide tube 510 can be inserted into the gas turbine engine toward a location of the indirectly accessible cavity and heated to cause the guide tube 510 to return to the bent shape in order to bring the inspection element 522 into the indirectly accessible cavity whereupon the inspection element 522 is disposed to inspect the indirectly accessible cavity. The guide tube 510 can subsequently be re-straightened following inspection completion and removed from the gas turbine engine.

Figure 6:
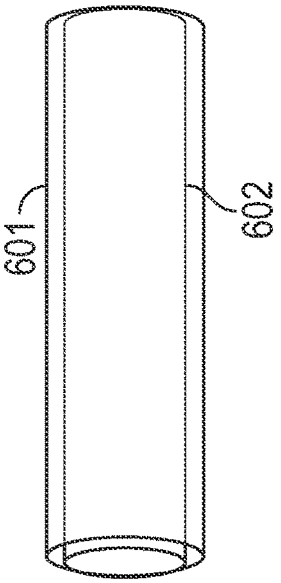
FIG. 6 is a side schematic view of a guide tube assembly for inspecting an indirectly accessible cavity of a gas turbine engine with a guide tube having outer and inner guide tubes in accordance with embodiments.

With reference to FIG. 6, the guide tube 510 can include an outer guide tube 601 and an inner guide tube 602. The outer guide tube 601 is formed of SMA and memorized into a bent shape and then straightened. The inner guide tube 602 is formed of SMA and is memorized into a straight shape and then bent. The outer and inner guide tubes 601 and 602 are coaxial and heated in a manner whereby each of the outer and inner guide tubes 601 and 602 return to their respective memorized bent or straight shapes at different temperatures. That is, when heated to a first elevated temperature, the outer guide tube 601 can return to the bent shape with sufficient force to cause the inner guide tube 602 to bend along with the outer guide tube 601. Then, when heated to a second elevated temperature, the inner guide tube 602 can return to the straightened shape with sufficient force to cause the outer guide tube 601 to straighten out along with the inner guide tube 602.

Figure 7:
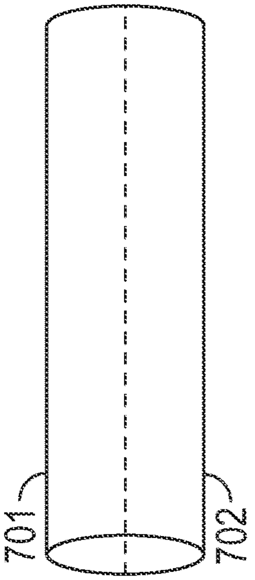
FIG. 7 is a side schematic view of a guide tube assembly for inspecting an indirectly accessible cavity of a gas turbine engine with a guide tube having first and second guide tube sides in accordance with embodiments.

With reference to FIG. 7, the guide tube 510 can include a first guide tube side 701 and a second guide tube side 702. The first guide tube side 701 is formed of SMA and is memorized into a bent shape and then straightened. The second guide tube side 702 is formed of SMA and is memorized into a straight shape and then bent. The first and second guide tube sides 701 and 702 are attached to one another and heated in a manner whereby each of the first and second guide tube sides 701 and 702 return to their respective memorized bent or straight shapes at different temperatures. That is, when heated to a first elevated temperature, the first guide tube side 701 can return to the bent shape with sufficient force to cause the second guide tube side 702 to bend along with the first guide tube side 701. Then, when heated to a second elevated temperature, the second guide tube side 702 can return to the straightened shape with sufficient force to cause the first guide tube side 701 to straighten out along with the second guide tube side 702.

Figure 8:
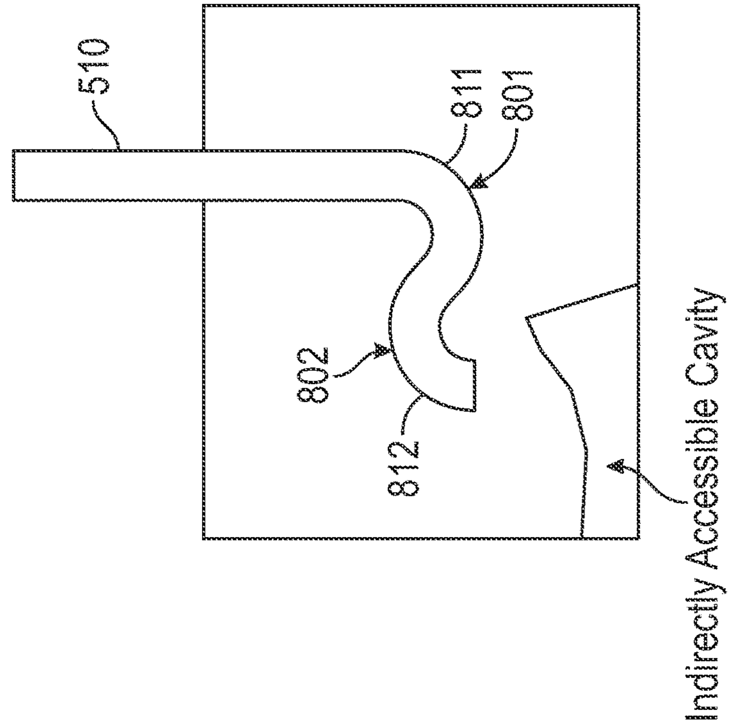
FIG. 8 is a schematic illustration of a guide tube for inspecting an indirectly accessible cavity of a gas turbine engine with multiple bends and local chemically tailored sections in accordance with embodiments.

With reference to FIG. 8, the bent shape of the guide tube 510 can be characterized in that the guide tube 510 has multiple bends 801 and 802. In these or other cases, the heating is executed to cause the guide tube 510 to return to the bent shape with the multiple bends 801 and 802 and a chemistry of the guide tube 510 can be tailored at local sections 811 and 812 proximate to the multiple bends 801 and 802, respectively, to support the multiple bends 801 and 802.

Technical effects and benefits of the features described herein are the provision of tubing that will improve inspection tool capability. This will avoid cases in which engine time on a wing is limited by powder metal defects of compressor and turbine rotors and other similar problems.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A method of inspecting an indirectly accessible cavity of a gas turbine engine, the method comprising:

memorizing a guide tube formed of smart metal alloy (SMA) into a memorized bent shape;

straightening the guide tube into a straightened configuration;

installing a scope, which comprises a connecting line to which an inspection element is attached, into the guide tube;

inserting the guide tube in the straightened configuration into the gas turbine engine toward a location of the indirectly accessible cavity;

heating the guide tube to cause the guide tube itself to recover the memorized bent shape from the straightened configuration, thereby moving the inspection element into the indirectly accessible cavity; and using the inspection element to perform an inspection of the indirectly accessible cavity.

2. The method according to claim 1, wherein the method further comprises:

re-straightening the guide tube following inspection completion; and removing the guide tube from the gas turbine engine.

3. The method according to claim 2, wherein the re-straightening of the guide tube is accomplished during the removing of the guide tube from the gas turbine engine.

4. The method according to claim 2, wherein the re-straightening of the guide tube comprises inserting a straightening rod into the guide tube.

5. The method according to claim 1, wherein the heating comprises directing hot air into the guide tube.

6. The method according to claim 1, wherein the memorized bent shape in characterized in that the guide tube has multiple bends and the heating is executed to cause the guide tube to return to the memorized bent shape with the multiple bends.

7. The method according to claim 6, further comprising tailoring a chemistry of the guide tube to support the multiple bends.

8. A guide tube assembly for inspecting an indirectly accessible cavity of a gas turbine engine, the guide tube assembly comprising:

a guide tube formed of smart metal alloy (SMA), which is memorized into a memorized bent shape and being configurable into a straightened configuration; and a scope, which comprises a connecting line to which an inspection element is attached and which is installed into the guide tube, wherein the guide tube is configured to be heated to cause the guide tube itself to transition from the straightened configuration to the memorized bent shape.

9. The guide tube assembly according to claim 8, further comprising a hot air source coupled to the guide tube and configured to heat the guide tube by directing hot air into the guide tube.

10. The guide tube assembly according to claim 8, wherein the guide tube is configured to be re-straightened following inspection completion and removed from the gas turbine engine.

11. The guide tube assembly according to claim 10, wherein at least one of:

the guide tube is configured such that the re-straightening of the guide tube is accomplished during removal of the guide tube from the gas turbine engine, and the guide tube assembly further comprising a straightening rod insertable into the guide tube to re-straighten the guide tube.

12. The guide tube assembly according to claim 8, wherein the guide tube comprises:

an outer guide tube, which is formed of SMA, and which is memorized into a bent shape and then straightened; and an inner guide tube, which is formed of SMA, and which is memorized into a straight shape and then bent, the outer and inner guide tubes being coaxial and heatable to return to the respective memorized bent or straight shapes at different temperatures.

13. The guide tube assembly according to claim 8, wherein the guide tube comprises:

a first guide tube side, which is formed of SMA, and which is memorized into a bent shape and then straightened; and a second guide tube side, which is formed of SMA, and which is memorized into a straight shape and then bent, the first and second guide tube sides being attachable and heatable to return to the respective memorized bent or straight shapes at different temperatures.

14. The guide tube assembly according to claim 8, wherein the memorized bent shape is characterized in that the guide tube has multiple bends and the heating is executed to cause the guide tube to return to the memorized bent shape with the multiple bends and a chemistry of the guide tube is tailored to support the multiple bends.

15. A guide tube assembly for inspecting an indirectly accessible cavity of a gas turbine engine, the guide tube assembly comprising:

a guide tube formed of smart metal alloy (SMA), which is memorized into a memorized bent shape and configurable into a straightened configuration; and a scope, which comprises a connecting line to which an inspection element is attached and which is installed into the guide tube, the guide tube being insertable into the gas turbine engine toward a location of the indirectly accessible cavity in the straightened configuration and heatable to cause the guide tube itself to return to the memorized bent shape in order to move the inspection element into the indirectly accessible cavity whereupon the inspection element is disposable to inspect the indirectly accessible cavity, and the guide tube itself being reconfigured into the straightened configuration following inspection completion and removed from the gas turbine engine.

16. The guide tube assembly according to claim 15, further comprising a hot air source coupled to the guide tube and configured to heat the guide tube by directing hot air into the guide tube.

17. The guide tube assembly according to claim 15, wherein at least one of:

the guide tube is configured such that the re-straightening of the guide tube is accomplished during removal of the guide tube from the gas turbine engine, and the guide tube assembly further comprises a straightening rod insertable into the guide tube to re-straighten the guide tube.

18. The guide tube assembly according to claim 15, wherein the guide tube comprises:

an outer guide tube, which is formed of SMA, and which is memorized into a bent shape and then straightened; and an inner guide tube, which is formed of SMA, and which is memorized into a straight shape and then bent, the outer and inner guide tubes being coaxial and heatable to return to the respective memorized bent or straight shapes at different temperatures.

19. The guide tube assembly according to claim 15, wherein the guide tube comprises:

a first guide tube side, which is formed of SMA, and which is memorized into a bent shape and then straightened; and a second guide tube side, which is formed of SMA, and which is memorized into a straight shape and then bent, the first and second guide tube sides being attachable and heatable to return to the respective memorized bent or straight shapes at different temperatures.

20. The guide tube assembly according to claim 15, wherein the memorized bent shape is characterized in that the guide tube has multiple bends and the heating is executed to cause the guide tube to return to the memorized bent shape with the multiple bends and a chemistry of the guide tube is tailored to support the multiple bends.

* * * * *